United States Patent [19]

Casey

[11] Patent Number: 4,639,383
[45] Date of Patent: Jan. 27, 1987

[54] METHOD AND APPARATUS FOR COATING PARTICULATE GRANULES

[75] Inventor: Thomas J. Casey, Barrington Hills, Ill.

[73] Assignee: Thomas Engineering, Inc., Hoffman Estates, Ill.

[21] Appl. No.: 854,735

[22] Filed: Apr. 21, 1986

Related U.S. Application Data

[63] Continuation of Ser. No. 534,185, Sep. 20, 1983, abandoned.

[51] Int. Cl.$^4$ .............................................. B05D 1/02
[52] U.S. Cl. ..................................... 427/213; 427/212; 427/242; 118/50; 118/58; 118/64; 118/303
[58] Field of Search ....................... 427/213, 212, 242; 118/50, 58, 64, 303

[56] References Cited

U.S. PATENT DOCUMENTS

| | | | |
|---|---|---|---|
| 212,125 | 2/1879 | Bray | 134/159 |
| 348,011 | 8/1886 | Henderson . | |
| 1,239,221 | 9/1917 | Rodman . | |
| 1,695,362 | 12/1928 | Bourges . | |
| 2,308,420 | 1/1943 | Hoopes | 91/3 |
| 2,736,288 | 2/1956 | Clay | 118/19 |
| 2,799,241 | 7/1957 | Wurster | 118/24 |
| 2,807,230 | 9/1957 | Brammar | 118/19 |
| 2,860,598 | 10/1958 | Loesche | 118/418 |
| 3,083,719 | 4/1963 | Herrling | 134/157 |
| 3,106,492 | 10/1963 | MacDonald | 118/62 |
| 3,141,792 | 7/1964 | Lachman | 118/6 |
| 3,167,035 | 1/1965 | Benson | 107/54 |
| 3,231,413 | 10/1962 | Berquin | 117/100 |
| 3,285,223 | 10/1966 | Sahlin | 118/64 |
| 3,348,262 | 10/1967 | Heian | 18/1 |
| 3,357,398 | 12/1967 | Gross | 118/418 |
| 3,358,302 | 12/1967 | Candor | 8/159 |
| 3,400,185 | 9/1968 | Kohnle | 264/117 |
| 3,401,668 | 9/1968 | Welsh | 118/70 |
| 3,573,954 | 4/1971 | Yamamoto | 117/27 |
| 3,573,966 | 4/1971 | Hostetler | 117/100 |
| 3,601,086 | 8/1971 | Hostetler | 118/19 |
| 3,761,549 | 9/1973 | Marshall | 264/15 |
| 3,834,347 | 9/1974 | Motoyama | 118/19 |
| 3,834,393 | 10/1974 | Groppenbacher | 117/100 |
| 3,877,415 | 4/1975 | Blouin | 118/303 |
| 3,903,333 | 9/1975 | Shirley | 427/212 |
| 3,911,860 | 10/1975 | Nohynek | 118/6 |
| 3,934,545 | 1/1976 | Schady | 118/19 |
| 3,991,225 | 11/1976 | Blouin | 427/3 |
| 4,050,406 | 9/1977 | Reni | 118/19 |
| 4,168,919 | 9/1979 | Rosen | 366/173 |
| 4,170,191 | 10/1979 | Juve | 118/705 |
| 4,245,580 | 1/1981 | Okawara | 118/19 |
| 4,334,493 | 6/1982 | Okawara | 118/19 |

FOREIGN PATENT DOCUMENTS

| | | |
|---|---|---|
| 85650 | 8/1983 | European Pat. Off. . |
| 2249863 | 4/1974 | Fed. Rep. of Germany . |
| 2805801 | 8/1979 | Fed. Rep. of Germany . |
| 2374968 | 8/1978 | France . |
| 9007747 | 4/1979 | Japan . |
| 82/03972 | 11/1982 | PCT Int'l Appl. . |
| 406540 | 6/1974 | U.S.S.R. . |

Primary Examiner—Shrive P. Beck
Attorney, Agent, or Firm—Allegretti, Newitt, Witcoff & McAndrews, Ltd.

[57] ABSTRACT

A method and apparatus for coating particulate granules is disclosed. The method is practiced by providing a fluidized charge of granules suspended in a flow of a drying gas within a rotating perforated coating pan. A portion of the fluidized granules is drawn along the pan's surface to a position above the fluidized charge of granules and allowed to cascade back into the fluidized charge. Flow of the drying gas is concentrated in the vicinity of the granules movement, and a coating material is dispensed onto the moving granules. The apparatus disclosed comprises a rotating perforated pan having gas inlet and exhaust plenums in contact with the rotating pan's exterior. The inlet plenum introduces a stream of drying gas to fluidize and suspend the agitated granules; the outlet plenum exhausts the drying gas and thereby draws granules along the pan's inner surface to the outlet plenum's position. A means for rotating the pan is provided, as is a pump or vacuum source for drawing granules to the exhaust plenum's location. Means for dispensing coating material within the pan are provided. In an alternative embodiment, a purge system is disclosed that dislodges granules that have become attached to the pan's perforated surface.

32 Claims, 9 Drawing Figures

METHOD AND APPARATUS FOR COATING PARTICULATE GRANULES

This application is a continuation of application Ser. No. 534,185, filed Sept. 20, 1983 now abandoned.

BACKGROUND OF THE INVENTION

This invention relates to a method and apparatus for coating particulate granules, and more particularly discloses a method and apparatus for coating particulate granular products such as pills, pellets, beads, tablets, dragees, nonpareils and the like, with pharmaceutical products and chemical treatments. The method and apparatus are also appropriate for coating foods, candies, nuts, fruits and the like with such things as chocolate and sugar.

A wide variety of pelletized or granulated products have been treated in the prior art by coating those products with an additional material. Common among such products are the full range of pharmaceuticals such as medicinally coated pills, tablets and non-pareils; chemical products such as detergents; and foodstuffs such as sugar or chocolate coated candies. Coatings for such products are applied either to provide a seal, or to add an additional material to the granular base. In many instances, it is desirable that the coating be uniformily and precisely applied, and with as few surface imperfections as possible. In the case of pharmaceutical coatings, uniformity is desirable to prevent waste of valuable drugs or medicines, and to ensure both accurate measurement of dosage and accurate delivery of dosage to patients; for all coated products, uniformity and precision reduces cost, and produces a more aesthetically pleasing product.

The coating materials to be applied to the granular products are usually either powders such as sugar, or are liquids, often in an aqueous or solvent solution. Both liquid and powdered coating materials lend themselves to coating granular products by dispensing the materials onto the granular particles. Dispensing is usually accomplished by spraying, poring, or ladeling the coating material onto the granules. To ensure uniformity, and to prevent the coated granules from adhering to each other during the drying process, coating materials are normally dispensed while the granules are tumbling in a pan or drum; the tumbling action tends to spread the coating material throughout the granules. Frequently, however, mere tumbling is insufficient to provide the requisite uniformity and to prevent adhesion between moistened granules; additionally, mere tumbling often produces dimpled and aesthetically displeasing final products.

Accordingly, it is desirable to apply the coating material to the tumbling granules simultaneously with the introduction to granules of a current of a drying gas. Although the current may be of any gas, the most commonly used gas is air. The air current, which is usually heated, substantially reduces the time required to dry coating materials, and reduces damage to the granules and their coatings by allowing coating with a less vigorous tumbling. Proper control of the air temperature, air flow rate, moisture content, vigorousness of granule tumbling, and flow rate and dispersion of the coating liquid tends to produce a final product that is uniformly coated, undamaged, and possessed of an aesthetically appealing smooth surface.

In the prior art, two principal techniques have been used to coat particulate granules. The most common technique is to provide a rotating pan or drum in which pellets or granules are allowed to tumble, while dispensing coating material onto the tumbling granules and drying the granules with a stream or flow of air. A second technique involves suspending the granules in a fluidized bed produced by a current of air in a vertical tube. The granules are held in tumbling suspension by the current of air, and are coated with a liquid injected into the fluidized bed.

An apparatus typically used in the prior art for the first such technique is that disclosed in Lachman, U.S. Pat. No. 3,141,792 for Automatic Tablet Coating Apparatus. Such devices require extensive supervision, and optionally include blades or mixing baffles within the rotating pan or drum to improve mixing of the granules during the coating operation. Devices of the kind disclosed in Lachman, though effective to provide coatings to granulated products, are not optimal for the coating operation. Waste of coating materials can result from contact of the coating material with the rotating drum, and dispersion of the drying air through the coated tablets is often less than is preferred. More effective use of drying air, accomplished through increased air dispersion, is desirable to speed the drying of individual granules. More precise control of the dispensing of coating material onto the granules is also desirable, in order to lessen the amount of coating material that will contact and adhere to the pan walls. This is an especially prevalent problem when the coating material is liquid. Thus, designers of coating devices seek methods and mchanisms that increase the volume and dispersion of air throughout the granulated particles during the coating operation, and control dispensing of the coating material to reduce the contact of the moist material with the pan walls.

Increased air dispersion and faster spread of the coating can be produced by increasing the granules' rate of tumble, either through a higher rotational velocity of the pan, or by introducing more vigorous agitation with mixing baffles or blades in the pan. However, mechanically increased agitation produces a higher velocity of granule movement, and increases the kinetic energy of each collision between agitated granules in the rotating drum. Additionally, mechanical agitation produces substantial frictional interaction between particles. Such friction affects both the integrity of the coating, and abrades the granules themselves. Collisions and friction produce product loss, surface contamination, and deterioration of the coated granules. Additionally, friction and collisions not only damage the granules, but produce as well an undesirable dust that is both a health and safety hazard.

Various techniques have been applied in the prior art to increase air dispersion and minimize the damage and deterioration resulting from agitation of granules during rotational pan coating operations. One such technique is the method of coating tablets disclosed in U.S. Pat. No. 3,573,966 issued to Hostetler for a Tablet Coating Method. The method disclosed therein includes placing a charge of tablets in a rotary drum having perforations in a portion of its exterior surface. During tumbling, drying air is drawn into the drum through the drum's exterior perforations and exhausted through the charge of tumbling tablets. By controlling the rotational speed of the drum such that the agitated tablets are maintained in a localized tumbling bed, and by exhausting drying air through the perforated surface directly at the location of the bed of tablets, increased dispersion of air and enhanced drying ability can be produced.

Alternatively, particulate granules have been coated in the prior art by spraying or dispensing coating material onto a fluidized bed of granules. This method is accomplished by placing granules in a vertical tube, and injecting a continuous flow of air in the bottom of the tube to suspend the granules against the force of gravity. Liquified coating material can then be dispensed into the suspended mass of granules. An apparatus for carrying out such a method is disclosed in U.S. Pat. No. 2,799,241 issued to Wurster for Means for Applying Coating to Tablets or the Like. Although such fluidized bed systems as Wurster increase dispersion of air throughout the tumbling granules, suspension of granules often require large air flow rates and high velocity air, thereby producing vigorous agitation of particles and increased fracture, damage, and contamination of the coated granules.

A combination of the fluidized bed and mechanically produced rotational agitation is therefore desirable. One such combination is disclosed in U.S. Pat. No. 3,357,398 issued to Gross for Method and Apparatus for Coating Tablets. Gross discloses a rotating drum with a perforated surface in which a charge of tablets is agitated by the drum's rotation. Drying air is injected directly into the charge to fluidize the tablets and place them in air suspension. The drying air is then randomly exhausted through the remaining perforated outer surface of the drum. Gross thereby provides increased air dispersion similar to that of the vertical column fluidized bed technique of Wurster, but in a rotating drum. However, additional increased air dispersion and further reduced product loss from agitation is still desirable.

Because many of the prior art coating techniques result in appreciable quantities of wasted coating material, either through contact of the coating material with the vertical column or rotating drum, or through loss of the coating material into the exhaust of the drying air, it is desirable that a method and apparatus by developed that further increases dispersion of the drying air, and further reduces agitation of the particles. Moreover, collisions and frictional interaction between granules results in loss of product into the air exhaust in the prior art coating techniques. Reduction of loss of coating material to the air exhaust is thus desirable.

Accordingly, it is an object of this invention to produce a method and apparatus for coating particulate granules such as pills, pellets, beads, tablets, dragees, non-pareils and the like.

It is another object of this invention to provide such a method and apparatus that increases dispersion of drying air during the coating operation.

It is a further object of this invention to provide such a method and apparatus that reduces granule agitation and friction, and consequently reduces fracture and destruction of the coated granules.

Yet another object of this invention is to produce such a method and apparatus that reduces the abrasion and quantity of dust produced from granule or particle collisions.

Still another object of this invention is to produce a method and apparatus for coating particulate granules that reduces loss of the coating material to the apparatus and air exhaust.

A further object of this invention is to produce a method and apparatus for coating particulate granules that improves control of the movement of air through the granules being coated.

Still another object of this invention is to produce a method and apparatus for coating particulate granules that improves mixing of the granules being coated and promotes uniform coating of the granules.

Yet another object of this invention is to provide a method and apparatus for coating particulate granules that adjustably controls dispersion of air through the granules being coated.

SUMMARY OF THE INVENTION

These and other objects of the invention are accomplished by producing a fluidized charge of particulate granules suspended in a flow of a drying gas within a rotating perforated coating pan or drum. A portion of the fluidized charge of particulate granules is drawn along the pan's surface to a position above the fluidized charge of granules, and allowed to fall back into the fluidized charge. When low density granules are coated, the granules fall back into the charge in a discrete cascade. Flow of the drying gas is concentrated in the vicinity of the granules movement. Coating material is dispensed onto the agitated granules. In the preferred method, liquid coating material is sprayed upon the surface of the charge, preferably near the interface of the charge with the cascade. In an alternative mode of practicing the method of this invention, separation of the portion of the agitated particles drawn above the fluidized bed from the drum's surface is aided by injection of a blast of air or gas through the perforated surface of the drum.

The apparatus for carrying out the invention of this disclosure, in its preferred embodiment, comprises a rotating pan or drum with a perforated cylindrical outer surface provided with two or more plenums in contact with the pan's rotating surface. A first plenum is positioned beneath an agitated charge of granules, and introduces a stream of drying air into the charge to fluidize and suspend the agitated granules. A second plenum is positioned above and in the vicinity of the fluidized charge of granules. The second plenum is connected to a pump to draw a portion of the fluidized granules out of the charge in an arcuate path above the charge, so that the drawn portion of the particles may cascade back into the fluidized charge. In alternative embodiments, additional plenums may be disposed about the pan to draw portions of the fluidized granules to different positions with respect to the pan. In further alternative embodiments, adjustable plenums may be constructed that allow control of the drawn portion of the fluidized granules.

The apparatus includes means for rotating the pan, along with a pump or vacuum source for drawing the granules, and a source of air for injection into the agitated granules. Additionally, the apparatus includes one or more coating material injection nozzles within the drum adapted to dispense or spray the agitated granules with the coating material. In an alternative embodiment, the apparatus includes a linear purge nozzle positioned above the exhaust plenum and attached to a high pressure air nozzle positioed above the exhaust plenum and attached to a high pressure air source, so that air may be injected through the perforated surface of the apparatus to help dislodge any granules that may have become attached to the perforated surface of the pan. In the preferred embodiment, the perforated surface is a two-layer wall, the first layer comprising a sturdy construction having large perforations, and the second layer comprising a fine mesh or screen of a size less than the diameter of the granules to be coated.

Other objects, advantages, and applications of this invention are apparent from the following detailed description of the preferred embodiment and explanation of practice of the method of the invention contained below.

DETAILED DESCRIPTION OF THE PREFERRED EMBODIMENT AND DETAILED EXPLANATION OF THE METHOD OF THIS INVENTION

Referring now to the drawings, explanation will be made of the preferred method of practicing the method of this invention, and a description will be provided of the preferred embodiment of the mechanism of this invention. It is to be understood that the mechanism described in this description and shown in the attached drawings is only one of several different mechanisms appropriate for the practice of the method of this invention. Similarly, the mechanism described and shown in the drawings illustrates but a few of the various mechanisms that embody the apparatus claimed. The method and apparatus of this invention are limited only by the language in the claims and not by any statements made in the following description.

Figure 1:
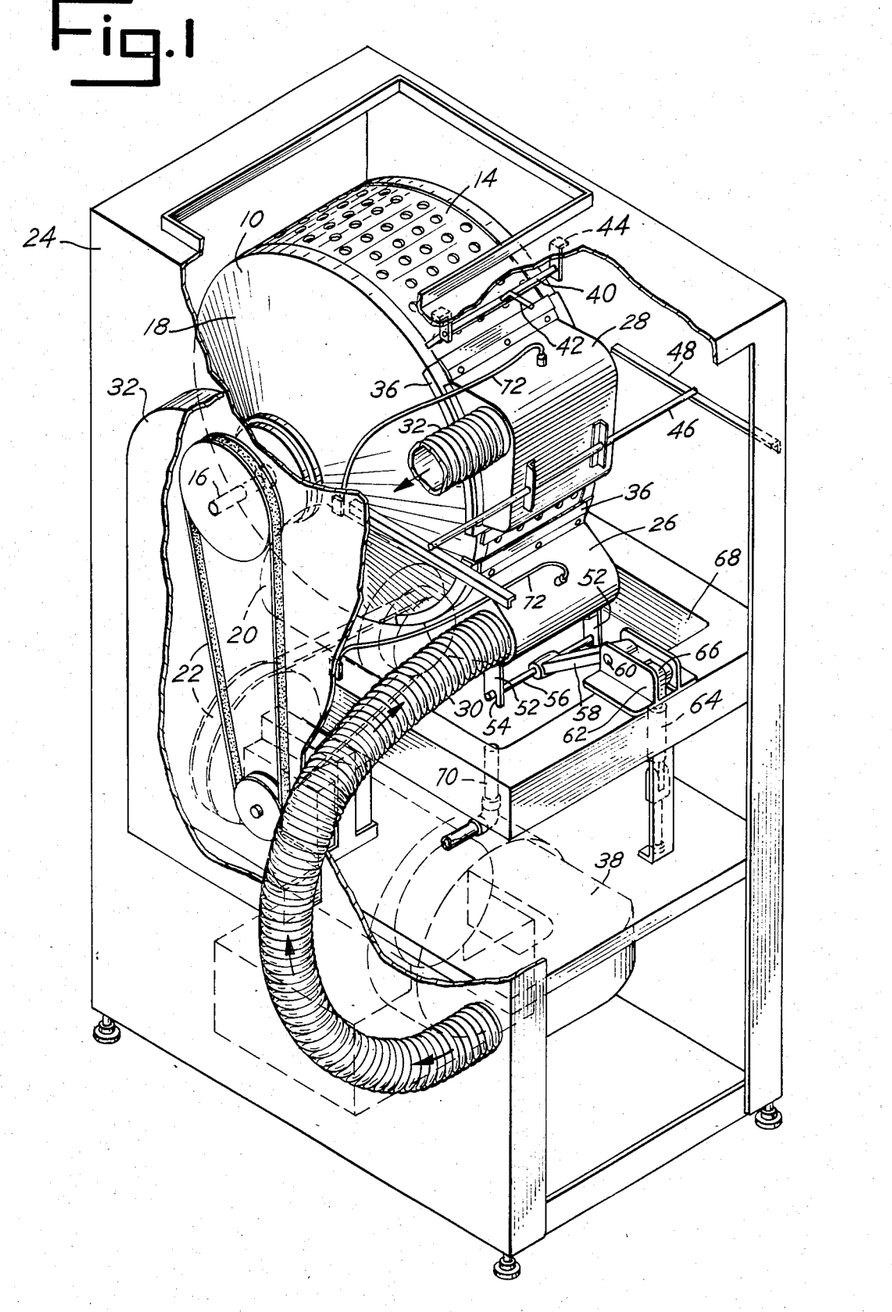
FIG. 1 is a rear perspective view of a preferred embodiment of the invention, and of an apparatus for carrying out the method of this invention.
Figure 2:
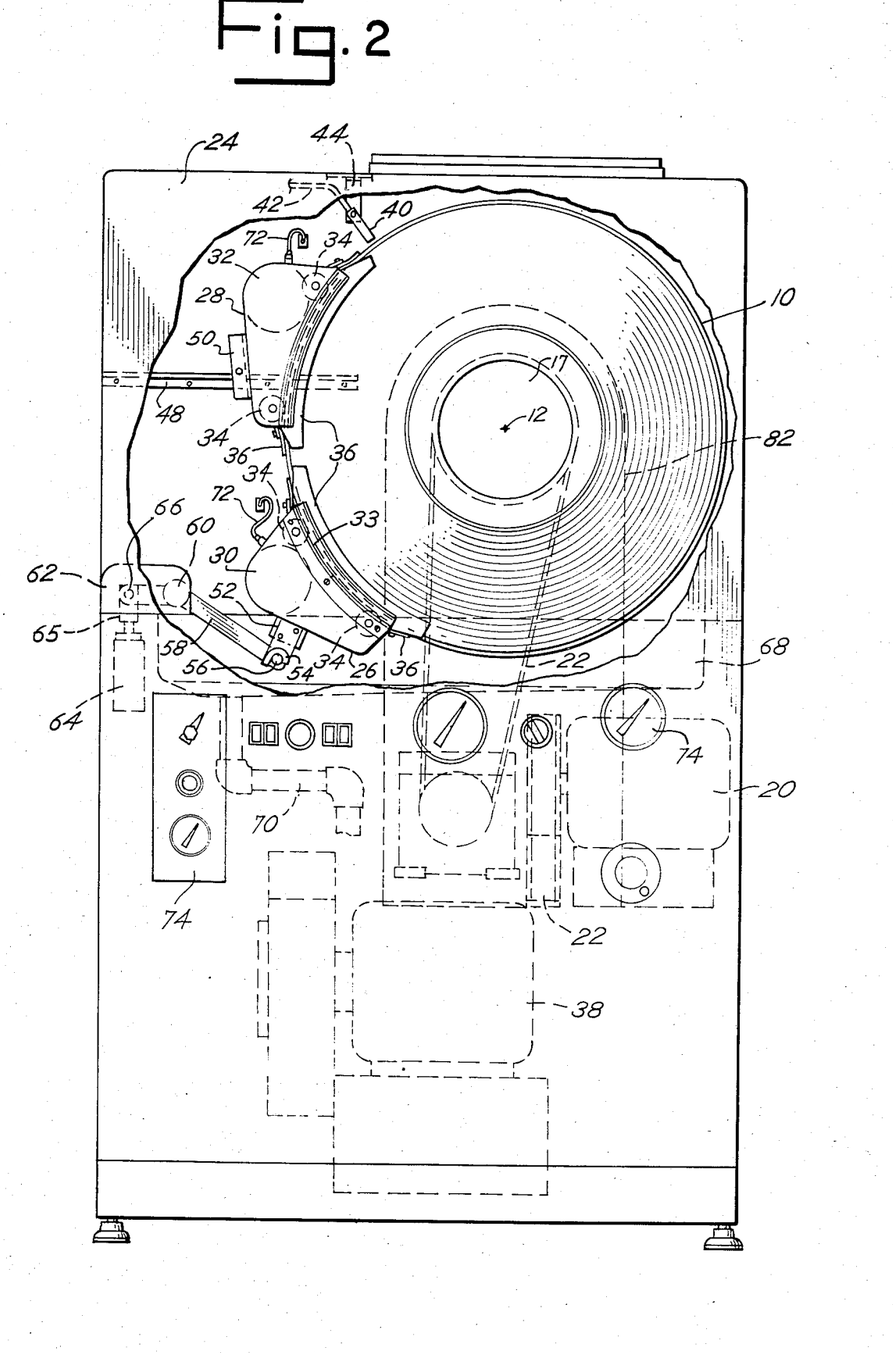
FIG. 2 is a front cut-away view of the apparatus shown in FIG. 1 displaying the rotating drum and the inlet and exhaust plenums.
Figure 3:
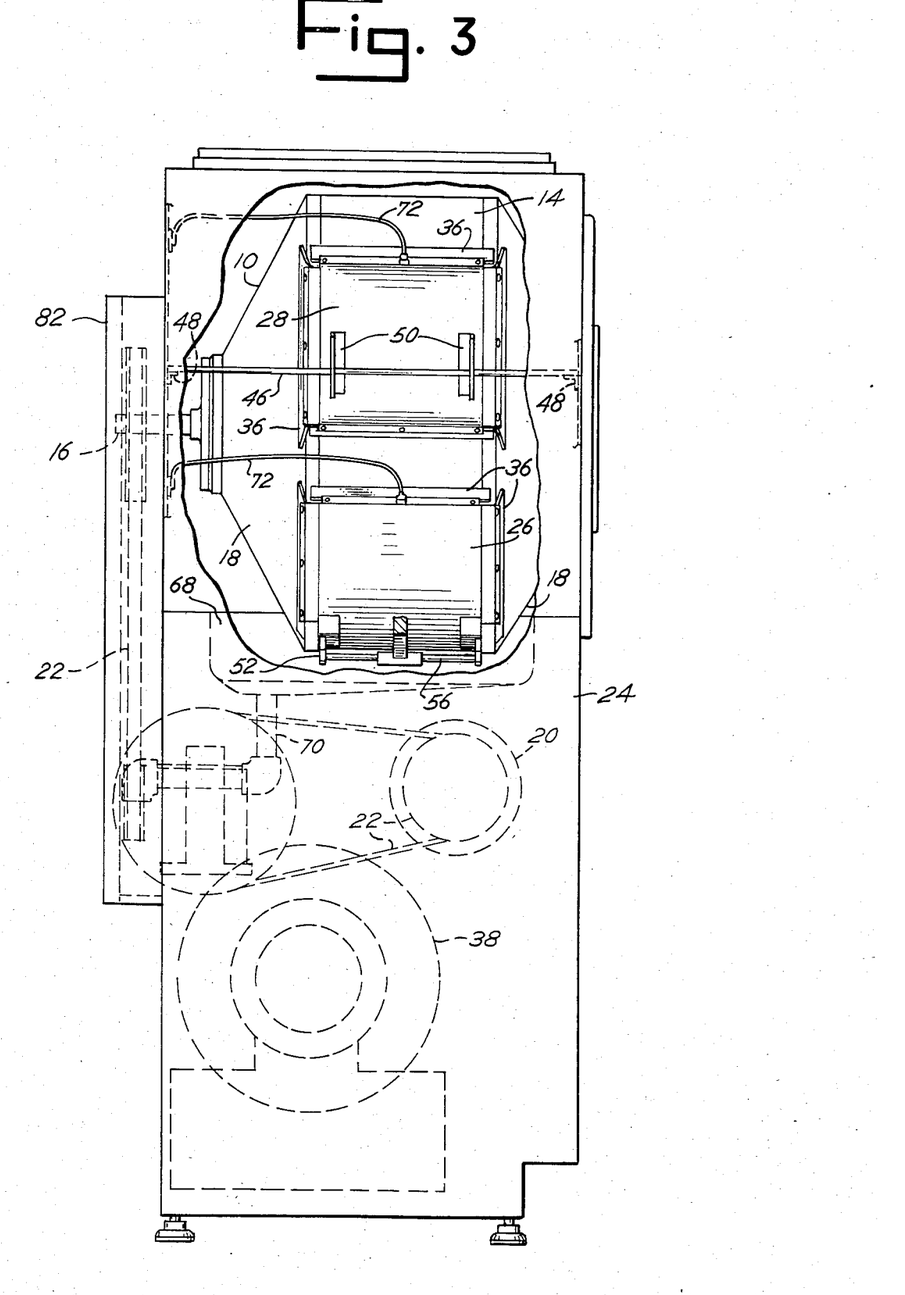
FIG. 3 is a left cut-away side view of the apparatus shown in FIG. 2.

Referring to FIGS. 1, 2, and 3, the preferred embodiment of the apparatus for this illustration is displayed. This embodiment also is appropriate for practice of the method of this invention. The coating apparatus generally has a coating pan or drum 10 that is rotatable about an axis 12 running through the center of the pan. The coating pan has a gas permeable outer surface 14, and is supported by an axle 16 through the drum's axis 12. In the preferred embodiment, the permeable nature of the coating pan is effected by making the pan's outer surface perforated. The coating pan 10 may be constructed in a variety of configurations; however, in the preferred embodiment the perforated outer surface 14 defines a cylinder, and frusto-conical sides 18 taper from the perforated outer surface to the axis of rotation 12 and axle 16. As shown in FIG. 2, the front of the pan contains a circular opening 17, through which granules and coating materials may be introduced into the pan. In an alternative embodiment, the opening may be contained in the rear of the pan. Rotation of the drum is provided by means of a motor 20 shown with hidden lines on FIG. 1, and rotational impetus is transferred from the motor 20 to the coating drum 10 through a series of belts and pulleys 22. The entire mechanism is supported by a frame 24, shown cutaway in FIGS. 1, 2, and 3 to better illustrate the apparatus. The frame 24 acts not only to support the mechanism, but also shrouds the mechanism to assist in reducing undesirable dispersion of dust or liquids that may escape outside the coating drum.

In the preferred embodiment, control of air is accomplished through the use of two plenums. Inlet plenum 26 is mounted in contact with the perforated surface 14 of the drum 10, beneath the axis of rotation 12. Outlet plenum 28 is also mounted in contact with the perforated outer surface 14, adjacent to and above inlet plenum 26. The inlet and outlet plenums are attached respectively to an air inlet conduit 30 and air exhaust conduit 32 (not shown in FIG. 3). Arrows on the air inlet and exhaust conduits in FIG. 1 show the direction of air flow into and out of plenums 26 and 28. Air flowing into inlet plenum 26 is directed to flow out of the lower portion of plenum 26 by a baffle 33 fitted to cover and seal the upper portion of plenum 26 across the full width of perforated surface 14. Air thus flows only into the lower part of the drum where a tumbling charge of granules is most likely to be located. As illustrated by FIG. 2, the inlet plenum 26 and outlet plenum 28 are maintained in rolling contact with the outer surface 14 of the coating pan or drum 10 by means of wheels 34 connecting the plenums to the coating pan. Although wheels are used in the preferred embodiment, the invention may alternatively be practiced through any form of sliding contact such that the inlet plenum 26 and outlet plenum 28 are maintained in close proximity to the perforated outer surface 14 during rotation of the coating pan 10.

To minimize loss of air along the edges of the plenums, both plenums are fitted with a series of sealing gaskets 36, maintained in sliding contact with the rotating pan 10 while air is pumped into and out of the plenums. Air is pumped into the inlet plenum 26 through inlet conduit 30 from an air pump 38. The embodiment shown in FIG. 1 displays air pumped directly from the pump 38 to the inlet plenum 26. Alternatively, air introduced into the coating pan 10 may be heated after leaving the pump 38 and before reaching the inlet plenum 26.

The preferred mechanism for purging the perforated outer surface 14 of the coating pan 10 of any particles or granules that may be lodged therein is illustrated by the injection nozzle 40 shown in FIGS. 1 and 2. The injection nozzle is an elongate nozzle having an opening spreading across the width of the perforated outer surface 14 to direct a blast of air through that perforated surface. The air is directed from a pump (not shown), through an air supply tube 42 to the injection nozzle 40. In the preferred embodiment, the injection nozzle 40 is supported by brackets 44 mounted on the frame 24.

Alternative constructions for supporting the inlet and outlet plenums are illustrated in FIGS. 1, 2, and 3. The outlet plenum 28 is supported on the frame 24 by a support rod 46 attached to frame brackets 48 affixed to the frame 24. Plenum support brackets 50 are mounted on the outlet plenum 28, which brackets are in turn on the support rod 46. An alternative detachable means for mounting the plenums is shown in FIGS. 1 and 2 for the outlet plenum 28. A pair of open support brackets 52 are mounted on the lower side of the plenum 26 with a U-shaped opening 54 resting over and supported by a lower support rod 56. A pivot rod 58 rotatably encases the lower support rod 56 and is pivotably attached at an intermediate portion of the pivot rod 58 about pivot 60 in rigid support 62. An air cylinder 64 is affixed to the rigid support 62 and the air cylinder's piston 65 is pivotably attached to the end 66 of the pivot rod 58. Removal of the inlet plenum 26 is thus easily effected by operating the air cylinder 64 to raise the end 66 of the pivot rod 58, rotating the end 66 of the pivot rod about the pivot 60 above the rigid support 62 and lowering the lower support rod 56 through the U-shaped openings 54 of the plenum support bracket 52. The plenum 26 moves downward simultaneous with the lowering of the lower support rod 56, moving the plenum 26 away from the coating drum 10 and allowing access to the perforated surface 14 of the coating pan. Because the U-shaped opening 54 does not fully encircle the lower support rod 56, the inlet plenum 26 can be lifted off the lower support rod 56 and removed entirely from the apparatus. Cleaning of the exterior of the coating drum 10 is thereby facilitated.

Cleaning of the coating pan 10 is also eased through use of a basin 68 mounted within the frame 24 below the coating drum 10. During cleaning operations, the pan 10 is sprayed or liquid washed, and the washing fluid collects in the basin 68. Collected washing fluid can then be drained through a drainage outlet 70.

FIGS. 1, 2, and 3 also illustrate additional features of the preferred embodiment. Because the inlet and outlet plenums 26 and 28 are in sliding or rolling contact with the rotating drum 10, and because the coating operation often generates dust which could be ignited by any electric or electrostatic discharge from the plenums, both plenums are grounded by a wire 72 connected to the frame 24. Additionally, the apparatus preferably contains integral control units and monitoring systems, as shown generally as 74 on FIG. 2.

Figure 4:
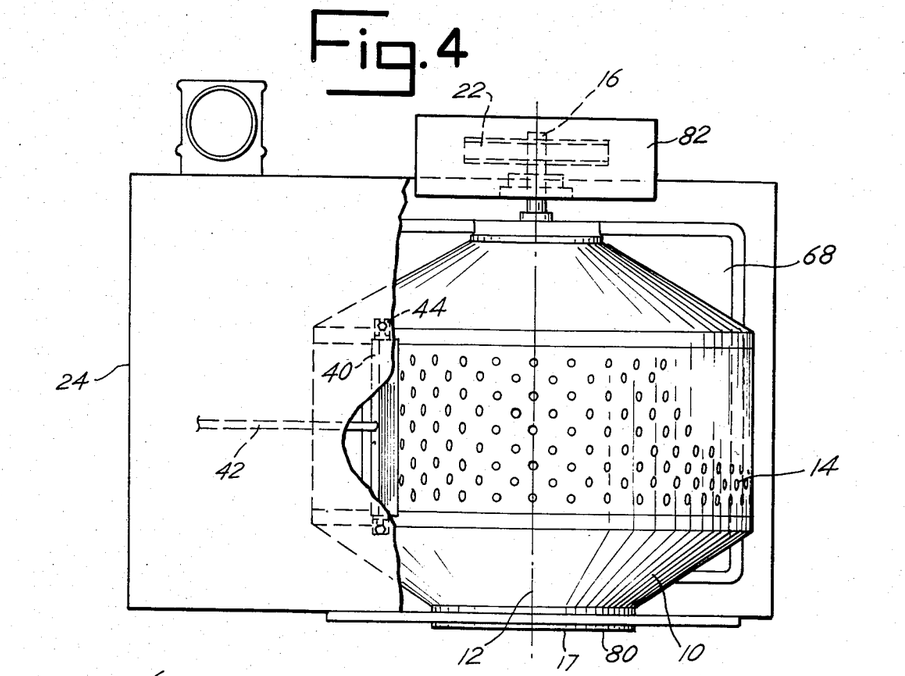
FIG. 4 is a cut-away plan view of the apparatus shown in FIG. 2, displaying the linear air purge nozzle.
Figures 5, 6:
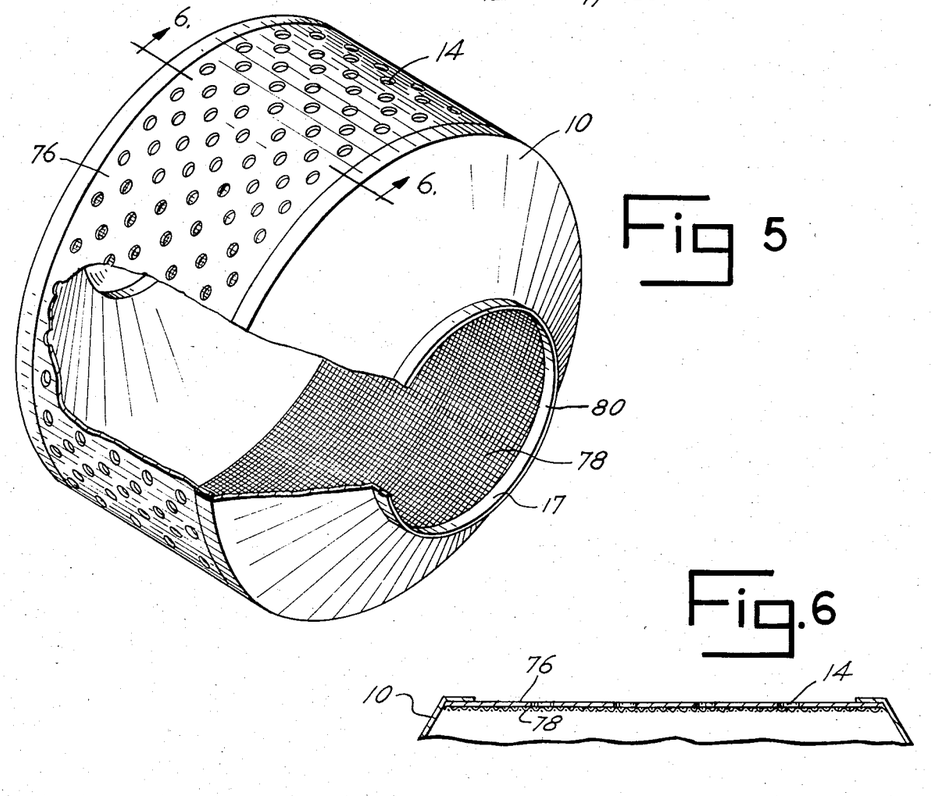
FIG. 5 is a perspective cut-away view of the drum shown in FIG. 2, illustrating the drum's dual layer perforated surface.
FIG. 6 is a cross-sectional view of a portion of the drum perforated surface shown in FIG. 5.

Referring now to FIGS. 4, 5, and 6, additional details regarding the construction of the preferred embodiment of the pan 10 are disclosed. As shown in FIG. 5, the coating pan or drum is preferably comprised of a two-layer perforated outer surface. The outer layer 76, possesses substantial structural rigidity, and is comprised of relatively large perforations (shown further enlarged in FIGS. 4 and 5 for purposes of illustration). The pan's inner layer 78 is a screen or mesh affixed to the inner surface of the coating pans perforated surface 14. The combination of the two layers allows strength and rigidity in the coating pan, and simultaneously allows fine granules, such as non-pareils, to be contained within the drum. A cross-section of a portion of the pan or drum illustrated in FIG. 5 is shown in FIG. 6 to illustrate the dual layers of the pan. FIGS. 4 and 5 also illustrate that the pan 10 has an opening 17 with a rim 80 to allow granules and coating material to be introduced into the drum. Additionally, FIG. 4 illustrates that the belts and pulleys 22 are maintained within a shroud 82 attached to the frame 24.

In operation, particulate granules are placed within the pan or drum 10, and the pan is rotated by impetus from the motor 20. The granules then tumble in an agitated bed on the lower portion of pan 10. Air, or any other appropriate gas, is then introduced as a stream into the pan 10 through the lower portion of inlet plenum 26, thereby suspending the tumbling granules in an air-fluidized mass. Because the pan rotates clockwise with respect to FIG. 2, the fluidized bed becomes positioned in the left lower portion of the pan 10 near the inlet plenum 26. Air is exhausted through the outlet plenum 28, creating a suction that draws portions of the granules along the rotating surface of the pan 10 to the vicinity of the outlet plenum 28. Movement of the granules along the pan's surface is assisted by the pan's rotation. Upon reaching the top of the outlet plenum 28, the drawn granules fall back into the tumbling bed of fluidized granules. If the drawn granules have a sufficiently low density, they fall back into the fluidized bed in a discrete cascade or "waterfall". Using this system, the majority of the air introduced into the pan 10 stays in close proximity to the granules to be coated. The majority of air flows from the inlet plenum 26 into the fluidized bed of granules, and then flows along with the drawn granules along the surface of the drum 10 to the vicinity of the outlet plenum 28. Only a small portion of the air exits through the remaining perforated surface 14 of the drum 10. Thus, the method and apparatus for practicing the method result in concentration of the drying air in the immediate vicinity of the agitated granules.

Coating of the granules during the tumbling operation is then accomplished by any of the well-known methods for introducing coating material to a coating drum. Liquid coating materials may be easily sprayed onto any portion of the agitated and fluidized bed of granules, by using a standard nozzle or spray system (not shown). Alternatively, coating material may be sprinkled, ladled, or poured onto the agitated and fluidized bed of granules.

Figure 7:
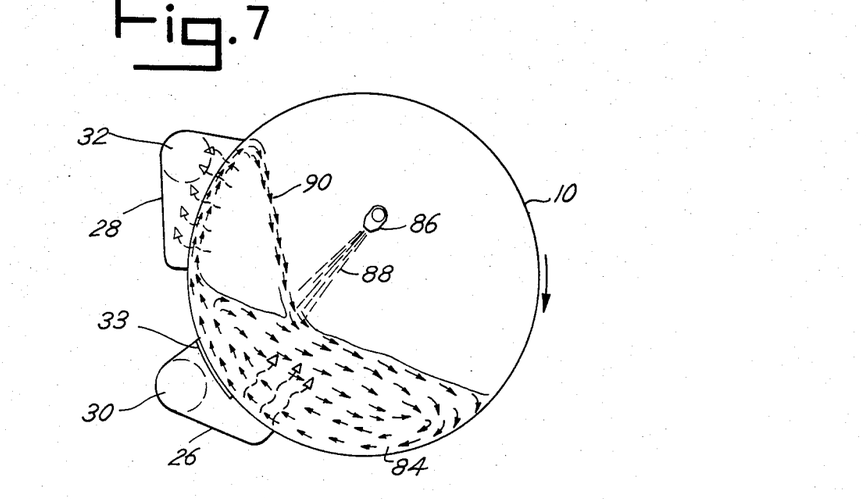
FIG. 7 is an illustration of a preferred embodiment of the method of this invention displaying flow of air and movement of granulated particles, and a preferred location of the coating material injection port.
Figure 8:
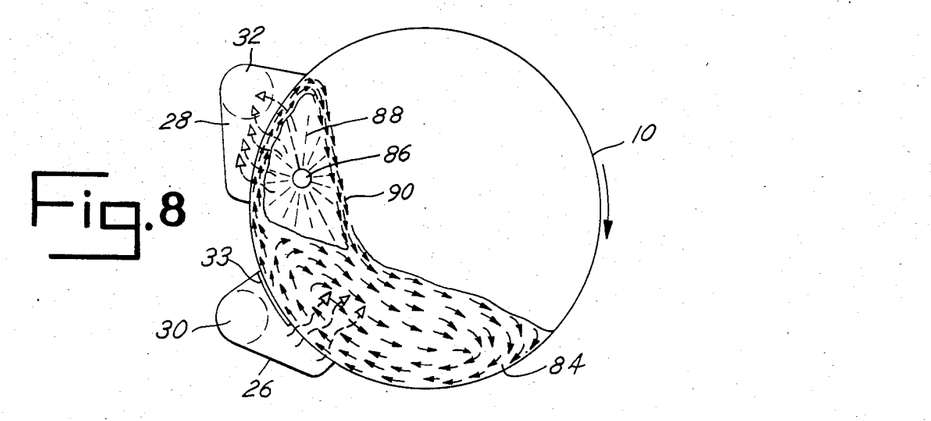
FIG. 8 is an illustration of an alternative embodiment of the method of this invention displaying an alternative location of the coating material injection port.
Figure 9:
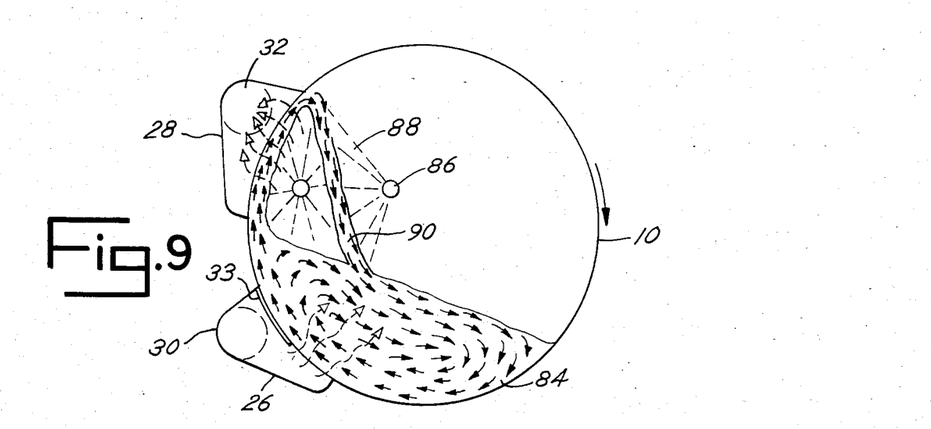
FIG. 9 is an illustration of a second alternative embodiment of the method of this invention displaying dual injection of the coating material.

Pictorial illustrations of the motion of granules during the coating operation and the flow of air through the coating pan are shown in FIGS. 7, 8 and 9. The basic coating operation is shown in FIG. 7. The drum 10 rotates clockwise, and contains an agitated bed of particles 84. Air, shown by the broken arrows, is blocked by baffle 33 and thus is introduced into the agitated bed 84 from the lower portion of the inlet plenum 26. The air acts to fluidize the particles by suspending them in tumbling relationship against gravity. Air is drawn out of the outlet plenum 28, as shown by the broken arrows in FIG. 7. The exhaust of air through plenum 28 draws a portion of the agitated bed of granules along the inner surface of the coating pan 10 to the crest of the outlet plenum 28. The drawn granules then cascade 90 from the top of the outlet plenum 28 back into the bed 84. Coating material can then be introduced to the moving granules. As shown in FIG. 7, a dispensing nozzle 86 can dispense a spray 88 of coating material directly onto the granules to be coated. Because the spray is directed at the agitated bed of granules and because the particles must move a substantial distance before they contact the surface of the coating pan 10, the movement of air through the agitated bed 84 results in substantial drying of the coated granules before they contact the inner surface of the pan 10. Hence, very little coating material contacts and is transferred to the inner surface of the pan 10.

Referring now to FIG. 8, an alternative embodiment of the invention and alternative mode for practicing the method of this invention includes a dispensing system inside the discrete cascade of granules. The spray of coating material can be directed in any or all directions. A further alternative, as shown in FIG. 9, includes dual dispensing of coating material, with one dispenser located outside discrete cascade 90 and the other located between the cascade and the drawn granules. Flow of air and movement of granules is substantially similar to the path shown in FIG. 7. In addition, other locations of dispensing mechanisms can be used to practice the method of this invention.

Although the illustrations of FIGS. 7, 8 and 9 show granules cascading in a discrete cascade 90 back into the agitated bed 84 without assistance from forces other than gravity, in practicality, some granules are likely to be lodged upon mesh 78 after passing the crest of the exhaust plenum 28. A purging system is therefore appropriate to dislodge the granules from the pan. Referring to FIGS. 4 and 2, the purging system in the preferred embodiment is an air blast system, including a source of high pressure air (not shown), introduced by an air supply tube 42 to a linear injection nozzle 40 positioned across the perforated surface of the pan 14. High pressure air is then forced through the outer layer 76 and inner layer 78 to dislodge any granules that may have attached to the inner surface of the drum 10. Although an air blast purge system is disclosed in this application, a variety of alternative purging systems and mechanisms may be used without deviating from the invention. For example, mechanical dislodging systems such as brushes or scrapers could be used.

Although the apparatus illustrated and described consists of two plenums, alternative embodiments of the invention are possible consisting of single plenum or multiple plenums. For example, three or more plenums could be constructed, with the additional plenums used to draw granules from the agitated bed 84 along a greater portion of the inner surface of the drum 10, thereby allowing the granules to return to the agitated bed 84 from a position other than shown in FIGS. 7, 8 and 9. Additionally, a single plenum could be constructed with an arrangement of interior baffles, to thereby introduce air to the pan from one portion of the plenum, and exhaust air from the drum through another portion of the single plenum. This invention can also be practiced with a system of position-adjustable plenums, or plenums with adjustable baffles in their interior. Any combination of adjustable baffles and multiple plenums could be arranged to produce a particular configuration of granules drawn along the surface of the pan that may be desired.

Other variations from the specific construction disclosed are also possible. Although the mixing pan is shown and described as a cylindrical drum with opposed frusto-conical sides, the invention may be practiced with a wide variety of other shaped pans, such as a simple cylinder, or a container with a complex shape. Moreover, although the drawings and description illustrate a coating pan having continuous perforations encircling the entire pan, the method and apparatus claimed could also use a pan having a gas permeable surface over only portions of its exterior. For example, the perforated section of the pan's surface could be located at discrete intervals about the pan's circumference. Finally, many of the terms used in the detailed description are used only for purposes of illustration, and should not be construed to limit the breadth of the invention. The terms "air", should be construed to including any gas, and the term "perforated" should be construed to include any kind of surface that is permeable to a gas. As used in the claims, the references to positions on a clock face are intended to represent positions on the "door" or "opening" side of a coating drum that rotates clockwise. It is expressly understood, however, that the invention can be practiced with a device that rotates counterclockwise, in which case all clock positions would be reversed; i.e., "9 o'clock" would become "3 o'clock" etc. The description and drawings are intended for purposes of illustration only, and the invention is limited only by the provisions in the claims.

What is claimed is:

1. A method of coating particulate granules, comprising the steps of:

placing a charge of granules into a container having an axis of rotation and a gas-permeable surface disposed radially about the axis of rotation;

rotating the container about the axis of rotation to agitate and mix the granules;

injecting a gas into the agitated granules through the permeable surface of the container to dry and fluidize the granules in the vicinity of the gas injection;

exhausting the gas through the permeable container surface at a position sufficiently close to the fluidized granules to draw portions of the fluidized granules along the rotating container surface to the exhaust location; and spraying the granules from one or more locations within the container with a coating material during the injection and exhaustion of the gas.

2. A method as claimed in claim 1 wherein the drawn granules cascade from the exhaust location in a flow separate from the movement of the granules along the container surface to the exhaust location.

3. A method as claimed in claim 1 further comprising the step of purging the container's gas-permeable surface with an injection of pressurized gas through the permeable surface into the container from a position following the exhaust location in the direction of the container's rotation.

4. A method as claimed in claim 1, wherein the velocity of the container's rotation is adjusted to maintain the granules in a tumbling bed localized within the rotating container and the injection and exhaustion of gas is accomplished in the vicinity of the bed's location.

5. A method of coating particulate granules, comprising:

agitating a bed of granules by tumbling the granules in a rotating pan and suspending the bed in a stream of a flowing gas injected into the pan;

exhausting the gas from the agitated bed, the exhaustion of the gas drawing a portion of the suspended granules from the bed and allowing the granules to be returned to the bed in a falling cascade; and dispensing a coating material upon the agitated granules.

6. A method as claimed in claim 5, wherein a portion of the rotating pan's outer surface is sufficiently porous to allow flow of gases therethrough, but not sufficiently porous to allow uncoated granules to pass through the surface, the flowing gas being injected into the pan through the rotating pan's porous surface, the injection occuring through a portion of that surface comprising substantially less than the pan's full porous surface area, exhaustion of the gas also occuring through the rotating pan's porous surface and through a portion of that surface comprising substantially less than the pan's full porous surface area, the gas being exhausted by stationing an outlet plenum on the exterior of the rotating pan's porous surface at a location above the bed and closely following the suspended bed in the direction of the pan's rotation, with the outlet plenum connected to a means for drawing gas from the outlet plenum.

7. A method as claimed in claim 6, further comprising purging the rotating pan's porous surface of materials lodged therein by spraying a pressurized gas through the porous surface into the pan from a location in the direction of the pan's rotation following the exhaustion of the injected gas.

8. A mechanism for coating particulate granules, comprising, in combination:
   a mixing drum having an axis of rotation and a gas-permeable surface disposed radially about the axis;
   means for rotating the drum about the axis of rotation;
   one or more inlet structures adapted for direct introduction of a gas into the rotating drum through no more than one third of the drum's permeable surface;
   an outlet structure separate from the inlet structures and covering a discrete, localized portion of the drum's permeable surface, the portion being no more than one third of the drum's circumference, the outlet structure being adapted for exhaustion of the gas from the rotating drum through the drum's permeable surface from one or more locations near an inlet structure, the locations being sufficiently close to the same inlet structure to draw the granules along the inner portion of the permeable surface of the drum from the vicinity of said inlet structure to the vicinity of the outlet structure;
   a source adapted to provide the gas to the inlet structures;
   means for drawing the gas from the drum through the outlet structure;
   one or more coating material dispensing ports positioned within the drum and adapted to produce a controlled dipersal of coating material onto the particulate granules within the drum;
   a source of a pressurized gas; and
   means for injecting the pressurized gas through the gas-permeable surface into the drum along a substantially linear segment of the permeable surface, parallel to the drum's axis of rotation and at a position immediately following the outlet structure in the direction of the drum's rotation, the means being separate from the inlet structures whereby injection of the pressurized gas through the gas-permeable surface purges the surface of any materials ledged thereon.

9. A mechanism as claimed in claim 8 wherein the means for injecting the gas through the gas-permeable surface comprises a linear nozzel adapted to receive gas from the source of a pressurized gas and discharge that gas at high velocity along a line through the gas-permeable surface.

10. A mechanism for coating particulate granules or the like, comprising, in combination:
   a mixing pan having an axis of rotation, and a porous surface disposed radially about the axis;
   means for rotating the pan about the axis of rotation;
   an inlet duct for injection of a drying fluidizing gas into the pan, the duct having walls and being attached for rolling or sliding contact to the outside of the lower portion of the pan on the porous surface and adapted to inject gas into the pan over an area comprising substantially less than the area of the pan's rotating porous surface;
   an outlet duct for exhaustion of the gas, the inlet duct and the outlet duct having adjacent walls that are spaced apart and separated by a distance greater than the thickness of the duct walls, the outlet duct being attached for rolling or sliding contact with the outside of the porous surface of the pan and positioned above the inlet duct in the direction of the pan's rotation, the outlet duct covering a discrete, localized portion of the pan's porous surface comprising no more than one fourth of the pan's circumference, the outlet duct being adapted to draw gas through the pan's porous surface from a position sufficiently close to the inlet duct to draw the granules along the inner side of the porous surface to the vicinity of the exhaust duct;
   a gas source adapted to provide gas to the inlet duct for injection into the pan;
   a pump adapted to draw gas from the pan through the outlet duct; and
   one or more coating material injection ports positioned within the pan and adaptd to spray one or more controlled sources of chemicals, foodstuffs or pharmaceuticals onto the granules within the pan.

11. A mechanism as claimed in claim 10 wherein the porous surface comprises a perforated uniform surface of generally circular cross section and covered with a screen having a mesh size less than the size of the granules.

12. A mechanism as claimed in claim 10 wherein the pan's side walls taper from the pan's porous surface toward the drum's axis of rotation.

13. A mechanism for coating particulate granules or the like, comprising, in combination:
   a mixing pan having an axis of rotation, and a porous surface disposed radially about the axis;
   means for rotating the pan about the axis of rotation;
   an inlet duct for injection of a drying and fluidizing gas into the pan, the duct having walls and being attached for rolling or sliding contact to the outside of the lower portion of the pan on the porous surface and adapted to inject gas into the pan over an area comprising substantially less than the area of the pan's rotating porous surface;
   an outlet duct for exhaustion of the gas separated from the inlet duct by a distance greater than the thickness of the inlet duct walls, the outlet duct being attached for rolling or sliding contact with the outside of the porous surface of the pan and positioned above the inlet duct in the direction of the pan's rotation, the outlet duct covering a discrete, localized portion of the pan's porous surface comprising no more than one third of the pan's circumference, the outlet duct being adapted to draw gas through the pan's porous surface from a position sufficiently close to the inlet duct to draw the granules along the inner side of the porous surface to the vicinity of the exhaust duct;
   a gas source adapted to provide gas to the inlet duct for injection into the pan;
   a pump adapted to draw gas from the pan through the outlet duct;
   one or more coating material injection ports positioned within the pan and adapted to spray one or more controlled sources of chemicals, foodstuffs or pharmaceuticals onto the granules within the pan; and a source of pressurized gas adapted to be injected through the rotating porous surface of the pan at a position closely following the exhaust duct in the direction of the pan's rotation, the injection of the pressurized gas being separate from the inlet duct, whereby injection of the pressurized gas purges the pan's porous surface of materials lodged on the pan's porous surface.

14. A method of coating particulate granules, comprising:

agitating a bed of granules by tumbling the granules in a rotating pan, the rotating pan's outer surface being sufficiently porous to allow flow of gases therethrough, but not sufficiently porous to allow uncoated granules to pass through the surface;

injecting gas into the pan through a first inlet plenum covering the discrete portion of the pan's outer surface;

exhausting the gas from the agitated bed through a discrete localized portion of the pan comprising substantially less than the pan's circumference;

dispensing a coating material upon the agitated granules; and purging the rotating pan's porous surface of materials lodged therein by spraying a separate pressurized gas through the porous surface into the pan from a second inlet plenum in a location in the direction of the pan's rotation following the exhaustion of the injected gas.

15. A method as claimed in claim 14, wherein the gas is exhausted by stationing an outlet plenum, separated from the inlet plenum, on the exterior of the rotating pan's porous surface at a location rotationally no more than 90 degrees following the agitated bed in the direction of the pan's rotation, with the outlet plenum connected to a means for drawing gas from the outlet plenum.

16. A mechanism for coating particulate granules or the like, comprising, in combination:

a mixing pan having an axis of rotation, and a porous surface disposed radially about the axis;

means for rotating the pan about the axis of rotation to agitate and mix a bed of particulate granules placed within the pan;

an inlet duct for injection of a gas into the pan, the duct being attached for rolling or sliding contact to the outside of the pan on the porous surface and adapted to inject gas into the pan over an area comprising substantially less than the area of the pan's rotating porous surface;

an outlet duct for exhaustion of the gas comprising a structure spaced apart and separate from the inlet duct, the outlet duct being attached for rolling or sliding contact with the outside of the porous surface of the pan and positioned above the bed of agitated granules in the direction of the pan's rotation, the outlet duct covering a discrete, localized portion of the pan's porous surface comprising substantially less than the portion covered by the bed of particulate granules and no more than one fourth of the the pan's circumference, the outlet duct being adapted to draw gas through the pan's porous surface from a position sufficiently close to the bed of agitated granules to draw the granules along the inner side of the porous surface to the vicinity of the exhaust duct;

a gas source adapted to provide gas to the inlet duct for injection into the pan;

a pump adapted to draw gas from the pan through the outlet duct; and one or more coating material injection ports positioned within the pan and adapted to spray one or more controlled sources of chemicals, foodstuffs or pharmaceuticals onto the granules within the pan.

17. A method of coating particulate granules, comprising:

agitating a charge of particulate granules by tumbling the granules in a rotating pan and simultaneously fluidizing the granules with a stream of flowing gas, with at least a portion of the rotating pan's surface being porous, and with fluidizing of the granules being accomplished by injecting the stream of flowing gas through the pan's porous surface into the charge of granules;

drawing a portion of the agitated granules from the charge in an arcuate path extending over the charge by the combined rotation of the pan and application of a means for drawing gas from the pan, the means applied in the vicinity of the fluidized granules at a withdrawal position removed from the fluidized charge in the direction of the pan's rotation, such that agitated granules are urged toward the withdrawal position by the rotation of the pan, and are drawn above the charge by the means for drawing gas from the pan to the withdrawal position's upper limit, whereupon the granules fall back into the bed in a cascade discrete from the arcuate path;

cascading the drawn granules back into the agitated charge; and dispensing a coating material upon the granules.

18. A method of coating particulate granules, comprising:

agitating a charge of particulate granules by tumbling the granules in a rotating pan and simultaneously fluidizing the granules with a stream of flowing gas, with at least a portion of the rotating pan's surface being porous, and with fluidizing of the granules being accomplished by injecting the stream of flowing gas through the pan's porous surface into the charges of granules;

drawing a portion of the agitated granules from the charge by the application of a means for drawing gas through the pan's porous surface in the vicinity of the agitated charge, which means simultaneously exhausts the flowing gaseous medium from the granules;

cascading the drawn granules back into the agitated charge; and dispensing a coating material upon the granules.

19. A method as claimed in claim 18 wherein the cascade results from application of the means for drawing gas from the pan over a limited area above the agitated charge, so that the granules are drawn to the crest of the area and are then allowed to fall back into the charge.

20. A method as claimed in claim 19 wherein the means for drawing gas from the pan is a pump.

21. A method as claimed in claim 20 wherein substantially all of the fluidizing gas stays within the agitated charge until drawn from the pan by the pump.

22. A method of coating particulate granules and the like, comprising the steps of:

fluidizing an agitated bed of granules by injecting a gas into the bed;

drawing a portion of the granules from the bed along an arcuate path directed toward the bed and allowing the granules to fall from the apogee of the arcuate path back into the fluidized bed in a discrete cascade separate from the bed and arcuate path and unsupported by the bed, the cascade being continuous throughout the entire coating operation;

dispensing coating material on portions of the granules from one or more sources; and drying the granules with the injected gas.

23. A method as claimed in claim 22 wherein the bed of granules is agitated by placing the bed in a rotating drum.

24. A method as claimed in claim 23 wherein the drum rotates about an axis of rotation and has one or more gas-permeable surfaces disposed radially about the axis of rotation, and the bed is fluidized by injecting a gas into the bed through the drum's gas permeable surface.

25. A method as claimed in claim 24, further comprising the step of purging the gas-permeable surface of the drum of materials lodged thereon by injecting a separate flow of gas through the gas-permeable surface into the drum.

26. A method as claimed in claim 22 wherein the granules are drawn from the bed by a pump with a plenum positioned higher than the bed and adjacent the drum's rotating gas-permeable surface.

27. A method as claimed in claim 22 wherein at least one injection source is positioned between the arcuate path and the discrete cascade of granules.

28. A mechanism for coating particulate granules, comprising, in combination:

a mixing drum having an axis of rotation and a gas-permeable surface disposed radially about the axis, the drum having positions definable by a clock face when observed from a position along the axis;

means for rotating the drum about the axis of rotation;

one or more inlet structures located below the 9 o'clock position and adapted for direct introduction of a gas into the rotating drum through no more than one quarter of the drum's permeable surface;

an outlet structure separate from the inlet structures and located above the 9 o'clock position, the outlet structure covering a discrete, localized portion of the drum's permeable surface, the portion being no more than one quarter of the drum's circumference, the outlet structure being adapted for exhaustion of the gas from the rotating drum through the drum's permeable surface from one or more locations near an inlet structure, the locations being sufficiently close to the same inlet structure to draw the granules along the inner portion of the permeable surface of the drum from the vicinity of said structure to the vicinity of the outlet structure;

a source adapted to provide the gas to the inlet structures;

means for drawing the gas from the drum through the outlet structure; and one or more coating material dispensing ports positioned within the drum and adapted to product a controlled dispersal of coating material onto the particulate granules within the drum.

29. A mechanism as claimed in claim 28, wherein the gas-permeable surface comprises a dual layer wall, one layer being relatively rigid and having relatively large perforations, the second layer being a mesh or screen attached within the drum over the entire first layer and having relatively small perforations.

30. A mechanism as claimed in claim 28 wherein the inlet structures and outlet structure each comprise a stationary plenum adapted to sheathe a portion of the outside of the rotating drum's permeable surface, and introduce or withdraw the gas through the permeable surface, the outlet structure positioned in a location rotationally closely following the inlet structure.

31. A mechanism as claimed in claim 28 wherein the mixing drum further comprises a cylindrical gas-permeable surface disposed radially about the drum's axis, and having opposed frustoconical pans disposed radially about the axis and affixed to opposite ends of the cylinder, with the pans tapering from the cylinder toward the axis of rotation.

32. A mechanism as claimed in claim 28 wherein the mixing drum is cylindrical, and the drum's gas permeable surface comprises the drum's curved surface.

* * * * *